April 12, 1932.   J. M. SAND   1,854,070
COOLER
Filed April 9, 1930   2 Sheets-Sheet 1

J. M. Sand, INVENTOR
BY Victor J. Evans
ATTORNEY

April 12, 1932.  J. M. SAND  1,854,070
COOLER
Filed April 9, 1930  2 Sheets-Sheet 2
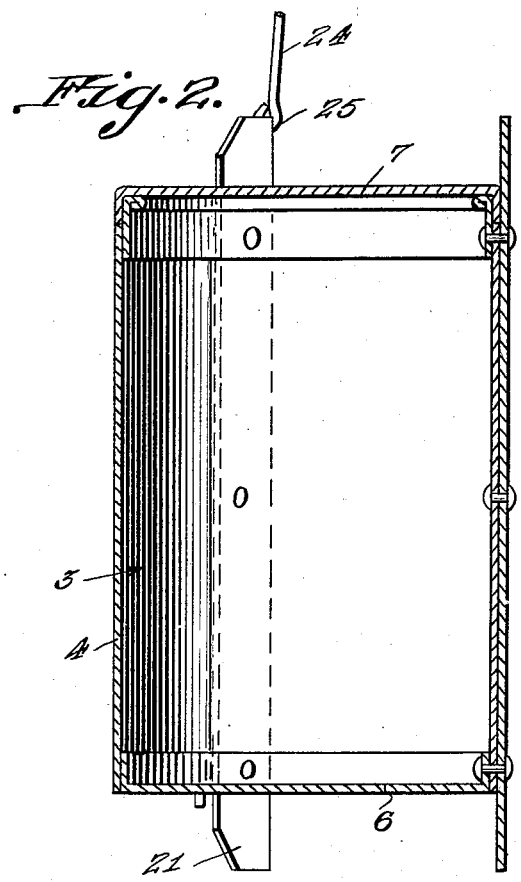
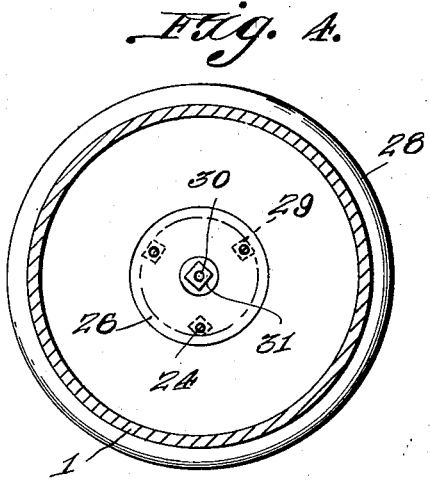
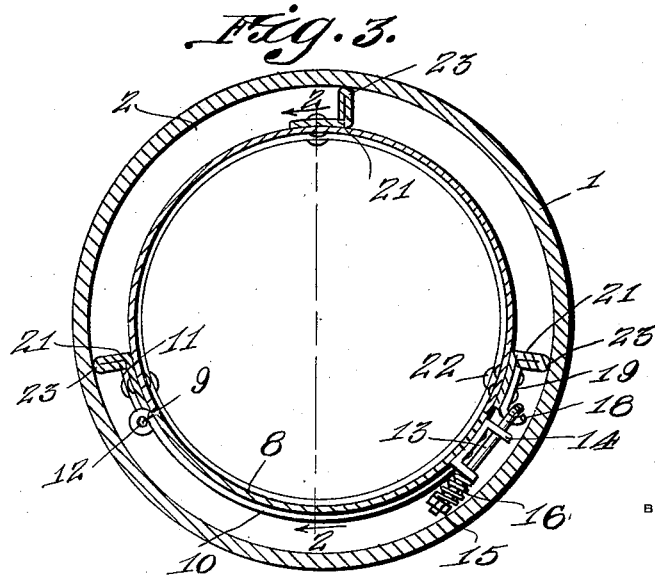
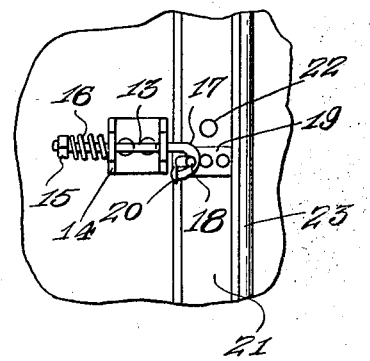
J. M. Sand INVENTOR
BY Victor J. Evans
ATTORNEY Patented Apr. 12, 1932

1,854,070

UNITED STATES PATENT OFFICE

JOHN M. SAND, OF GARVIN, MINNESOTA

COOLER

Application filed April 9, 1930. Serial No. 442,913.

This invention relates to an apparatus for storing food-stuffs or products in a manner to preserve the same for a reasonable length of time without the employment of ice or any other refrigerating medium which must be purchased.

Another object of the invention is to provide means whereby a low natural temperature may be taken advantage of in preserving food-stuffs or products and, in this connection, the invention contemplates the storing of food-stuffs in a container which is normally positoned in the bottom of a closed housing which is embedded in the ground to such a depth as to be kept at a sufficiently low temperature to maintain the freshness of the food-stuffs or products, means being provided whereby the container may be brought to ground level so that the contents thereof may be removed for consumption or the supply replenished.

This invention also consists in certain other features of construction and in the combination and arrangement of the several parts to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:—

Figure 2 is a vertical sectional view through the container of the apparatus.

Figure 3 is a horizontal sectional view taken substantially on the line 3—3 of Figure 1 looking in the direction indicated by the arrows.

Figure 4 is a similar view on the line 4—4 of Figure 1 looking in the direction indicated by the arrows.

Figure 5 is a fragmentary view in elevation illustrating a means for holding the door of the container in closed position.

Figure 1:
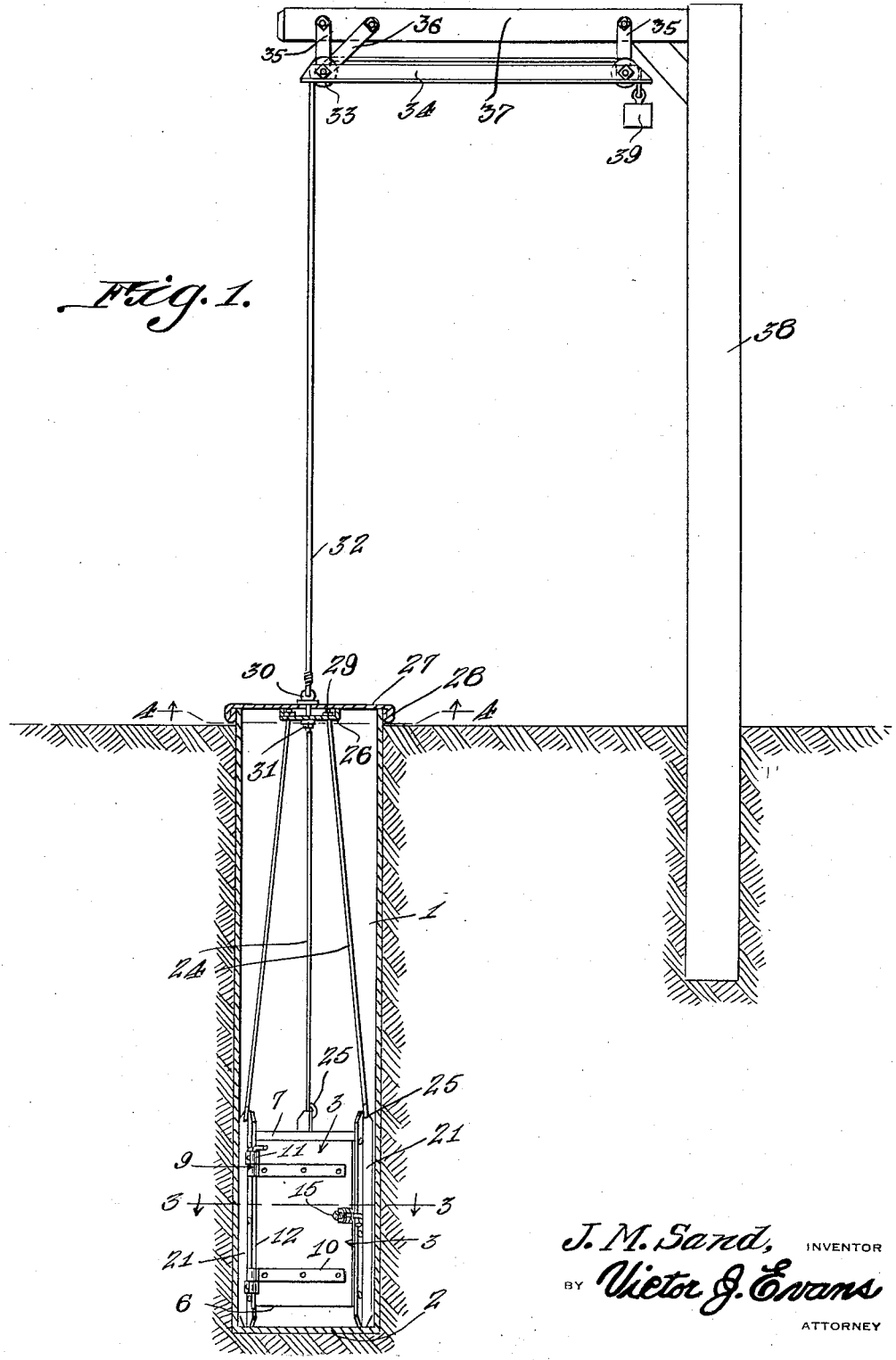
Figure 1 is an elevational view partly in section and illustrating the apparatus embodying the invention.

The apparatus comprises a housing 1 which is of hollow cylindrical form and which may be of galvanized sheet metal, to avoid corrosion, and this housing is open at its upper end and closed at its lower end by a bottom 2 and in installing the apparatus, the housing is embedded in the soil to extend to a depth considerably below the frost zone of the soil. Arranged within the housing is the container for the food-stuffs to be stored and this container, which is indicated in general by the numeral 3, is likewise preferably of sheet metal, such for example as galvanized iron, and the same comprises a hollow cylindrical body 4 closed by a bottom 6 and closed at its upper end by a top closure 7. At one side, the body 4 of the container is formed with an opening and an arcuate door 8 which constitutes a movable section of the body 4, is hingedly mounted at one side as at 9 upon the body preferably by strap hinges 10 which extend about the outer side of the door and other hinged members 11 which are mounted upon the body at that side of the opening therein at which the door is hinged, a rod 12 being fitted through the hinged members to connect the same. In order that the container door may be kept closed, a latch means is provided which will now be described.

The latch means referred to above comprises a bolt member which is indicated by the numeral 13 and is slidably mounted in the spaced ears of a bracket member 14 which is secured upon the outer side of the door at the free side thereof, a nut 15 being fitted to one end of the bolt and a compression spring 16 being fitted upon this end of the bolt and bearing between the nut and one of the ears 14.

The other end of the bolt is formed with a hook bill indicated by the numeral 17 which a hook bill is engageable with a keeper hook 18 formed at one end of an attaching member 19 which is mounted upon the body of the casing at the other side of the door opening therein. The end of the hook bill 17 is preferably provided with a rounded head 20 whereby pressure may be exerted thereagainst to shift the latch member 13 bodily against the tension of the spring 16 to disengage its bill 17 from the keeper hook 18.

In order that the container body may be supported with its bottom elevated above the bottom 2 of the housing 1 and its wall 4 spaced from the wall of the housing, angle irons 21 are disposed against the outer side of the wall of the container at equally spaced intervals in the circumference thereof and secured in place by rivets or other suitable fastening elements 22 and the other wings of the angle irons are overturned upon themselves as indicated by the numeral 23 and their bends or folds engage against the inner surface of the wall of the housing 1.

In order that access may be gained to the container by elevating the same to the ground level, rods 24 are connected at their lower ends as at 25 to the upper ends of the angle irons 21 and it will be observed at this point and particularly by reference to Figure 1 that the lower ends of these angle irons project below the bottom 6 and rest upon the bottom 2 of the housing 1. The upper ends of the rods 24 are threaded and fit through openings formed in a circular pan member 26 which is disposed against the under side of a cover or lid 27, nuts 29 being threaded upon the upper ends of the rods 24 and housed within the pan member. The cover 27 is of circular form and carries another peripheral flange as indicated by the numeral 28 to adapt it to fit snugly over the upper end of the body of the housing 1.

An eye-bolt 30 has its shank fitted thru alined openings in the cover 27 and the member 26 and a nut 31 is threaded onto the lower end of the shank. At this point it will be evident that, inasmuch as the eye 30 engages the upper side of the cover 27, tightening of the bolt 31 will serve to secure the member 26 securely in place against the under side of the cover 27. A cable 32 is connected at one end to the eye 30 and is led upwardly and over a pulley 33 mounted between a pair of angle iron bars 34 which are connected by hanger-links 35 and braces 36 with an arm 37 which extends laterally from the upper end of a post 38, the lower end of which post is embedded in the soil. A counter weight 39 is connected to the other end of the cable and serves, to a greater or less degree, to counter-balance the weight of the container and the products contained therein.

It will now be evident that by pulling upwardly upon the cable 32, an upward pull will be exerted upon the rods 24 and the cover 27 thus dislodging and elevating the cover and effecting an upward pull upon the angle bars 21 so as to cause upward movement of the container 3 and, as soon as the container has been brought to the ground surface, the door 8 may be opened by pressure against the finger knob 20 and the door swung to open position and access gained to the food products within the container. After the desired food products have been removed, they may be replenished by introduction of similar products into the container and likewise a further supply of any food product or commodity may be at such time introduced into the container.

It will be evident that the cover 27 serves to seal the top of the housing 1 so that insects or rodents cannot enter the housing nor will rain water enter the housing. It will further be understood that the points of the weight 39 may be varied or other weights may be connected with the upper end of the cable 32, if desired.

What I claim is:—

1. The combination of a cylindrical body adapted to be confined beneath the surface of the ground and opening upwardly therethrough, a post at one side of said body and having an arm overhanging the latter, hangers carried by the arms, a receptacle receivable in the body, a cover for the open end of said body, rods connected with the cover and with said receptacle to suspend the latter from the cover, guide pulleys carried by the hangers, and a weighted cable trained over the guide pulleys and having connection centrally with the cover.

2. The combination of a cylindrical body adapted to be confined beneath the surface of the ground and opening upwardly therethrough, a post at one side of said body and having an arm overhanging the latter, hangers carried by the arm, a receptacle receivable in the body, a cover for the open end of said body, rods connected with the cover and with said receptacle to suspend the latter from the cover, guide pulleys carried by the hangers, and a weighted cable trained over the guide pulleys and having connection centrally with the cover, the said rods being of a length to permit the receptacle to be brought to rest in the body when the cover is engaged on the open end of the latter.

In testimony whereof I affix my signature.

JOHN M. SAND.